J. H. CAPWELL.
SPEED INDICATOR.
APPLICATION FILED APR. 12, 1910.
980,198.
Patented Jan. 3, 1911.
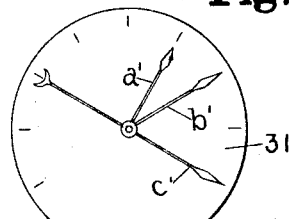
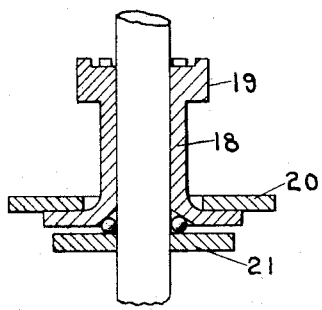
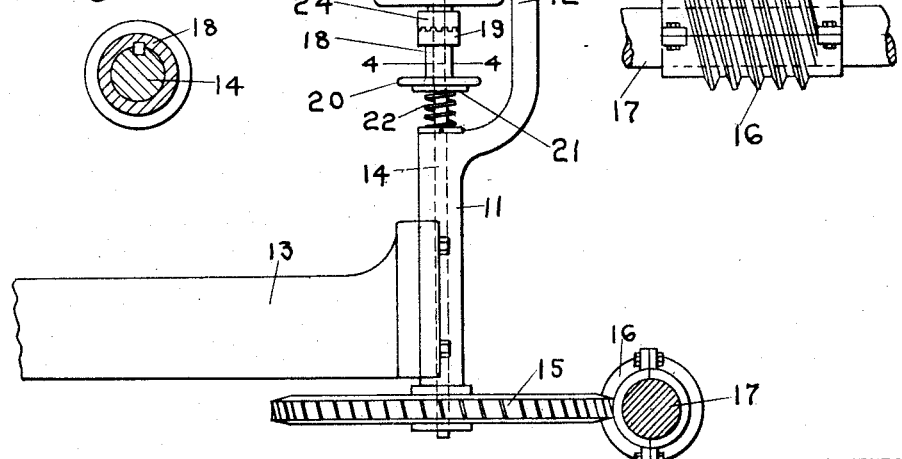
WITNESSES
Herbert L. Kelley
E. J. Ogden
INVENTOR
John H. Capwell
BY
Howard E. Barlow
ATTORNEY

UNITED STATES PATENT OFFICE.

JOHN H. CAPWELL, OF ANTHONY, RHODE ISLAND.

SPEED-INDICATOR.

980,198.  Specification of Letters Patent.  Patented Jan. 3, 1911.

Application filed April 12, 1910. Serial No. 554,913.

*To all whom it may concern:*

Be it known that I, JOHN H. CAPWELL, a citizen of the United States, residing at Anthony, in the county of Kent and State of Rhode Island, have invented certain new and useful Improvements in Speed-Indicators, of which the following is a specification, reference being had therein to the accompanying drawing.

This invention relates to means for indicating the speed of shafting, and is designed especially to enable the foreman or superintendent of a mill to not only determine whether a shaft, such as the prime power shaft running a number of looms or mules has run below or above its proper or normal speed, or is at the moment of examination running above or below the normal speed.

In the production of many lines of goods, it is quite essential that the shaft which drives one or more pieces of mechanism for producing the goods shall have a fixed speed of operation, because that speed determines the output of the mechanism or mechanisms driven by that shaft. If it be in a mill, and the prime power shaft runs a number of looms or mules, a slight reduction in speed of the power shaft, even for a not very long time, will result in considerable loss simply because of the reduction in output.

The object of this invention is to provide a simple indicator which is permanently connected to the power shaft and which will, as above stated, enable an attendant to readily determine whether the power shaft has been running at a too low or too high speed, or is so running at the moment of examination, so that the attendant can then notify the engineer whether the speed of the shaft should be increased or decreased.

A further object of the invention is to provide improved means whereby the connections of the indicator with the power shaft can be quickly broken, and the indicating mechanism advanced or set back so as to put it in accord with an independently driven time indicating mechanism.

With these and other objects in view, the invention consists of certain novel features of construction, as will be more fully described and particularly pointed out in the appended claims.

In the accompanying drawings: Figure 1— is an elevation of an indicator constructed according to my invention. Fig. 2— is a detail side elevation, partly in section. Fig. 3— is a detail elevation of the worm which is put on the shaft the speed of which is to be indicated. Fig. 4— represents an enlarged section on line 4—4 of Fig. 1. Fig. 5— is a detail view, partly in section, of a slight modification hereinafter described.

The frame of the device comprises upper and lower portions 10 and 11 respectively, these portions forming bearings for the spindles presently described, said portions being connected by a web member 12. One of the frame members is securely attached to a bracket 13 which in turn may be supported in any suitable manner. When constructed as shown in Fig. 1, the frame extends upwardly from said bracket, but it is to be understood that said frame might depend from a supporting bracket, or extend in any other direction therefrom, it being only essential that the supporting bracket employed shall hold the indicator in proper relation to the power shaft the speed of which is to be indicated.

In the structure illustrated, a spindle 14 is mounted in the portion 11 of the frame, said spindle having secured to its lower end a worm gear 15, said gear meshing with a worm 16 on the power shaft 17. The worm is shown as formed on a sleeve which is constructed in two semicircular parts adapted to be clamped onto the shaft 17.

Mounted on the upper end of the spindle 14 so as to rotate therewith but to be capable of longitudinal movement thereon, is a sleeve 18 having a clutch member 19 and carrying a disk 20 the purpose of which will be presently described. The lower end of the sleeve 18 is formed with a base plate, or may rest on a washer 21 which in turn is supported by a spring 22 coiled about the spindle 14 and bearing on the upper end of the portion 11 of the frame. The object of the disk 20 and spring 22 is to enable the clutch member 19 to be depressed when desired by the pressure of the attendant's finger downwardly upon the disk 20.

Mounted in the portion 10 of the frame is a spindle 23 having a clutch member 24 at its lower end and provided with a disk 25 whereby the spindle 23 may be rotated by the attendant whenever the clutch member 19 is disengaged from the member 24 by pressing down upon the disk 20. Normally of course the parts are retained in the positions indicated in Fig. 1, by means of the spring 22.

Near the upper end of the frame member 10 is a bracket 26 which supports the casing 27 of an indicator having pointers a, b and c, similar to the hour hand, minute hand and seconds hand of a clock or watch. The time train in the casing 27 will be similar to the ordinary time train of a clock or watch, but instead of being driven by a spring or weight, said train is driven by means of a shaft 28 having bevel pinion 29 meshing with a bevel pinion 30 secured to the upper end of the spindle 23. The speed with which the hands a, b and c are to be actuated so as to move relatively to each other the same as do the hands or pointers of a clock or watch, will at the outset be governed by the proportions of the gearing 15, 16, 29 and 30. These will be proportioned according to the known and desired normal speed of the power shaft. That is, when the known speed of the shaft 17 is, for instance, 60 rotations a minute, the gearing described will be so proportioned that the hand or pointer c will make exactly one complete rotation a minute. If the normal speed of the shaft 17 is greater or less, the proportions of the gearing will be altered so that the hand or pointer c will still make one complete rotation a minute. This is in order that, when the shaft is running at normal speed, the hands a, b and c of the indicator will exactly accord with similar hands carried by a clock or watch. The said independent time indicating mechanism might be some adjacent clock, or the watch of the attendant. For convenience however I have provided, in the embodiment illustrated, a clock 31 just above the indicator 27 and supported by the casing of the latter, it being understood of course that the hands or pointers a', b' and c' of the clock 31 are driven by an independent motor such as a spring or weight, but always running of course on the ordinary time of a clock or watch.

Before describing the operation of the mechanism, I will mention that the sleeve 18 may be constructed, as shown in Fig. 5, with an outwardly projecting flange at its lower end, anti-friction balls being located between said flange and the spring-supported washer 21. The finger disk 20 simply rests loosely upon the flange of the sleeve 18. With the gearing properly proportioned according to the particular power shaft to which the device is applied, when said shaft is running at its normal and desired speed the hands or pointers a, b and c will travel in unison with the hands or pointers a', b' and c' of the independently driven time indicating mechanism. If the attendant or superintendent finds at any time that the indicator 27 has run ahead of or behind the indicator 31, he knows at once that the power shaft 17 has been either running too fast or too slow, and he can warn the engineer to keep better control. If, while the indicator is being inspected, it is found that the hand c is running slower than the seconds hand c' (half a minute being sufficient to determine this), the engineer can be at once notified to speed up the power shaft 17. Whenever there is any discrepancy between the two indicators 27 and 31, and it is desired to set them in unison so as to facilitate the next observation it is only necessary for the attendant to press one or two of his fingers on the disk 20 so as to separate the clutch members 19 and 24, and then with another finger of the same hand revolve the disk 25 and spindle 23 in the proper direction and to the proper amount to set the hands a, b and c again in accord with the hands a', b' and c', this setting being done while continuing the pressure on the disk 20, and being easily accomplished owing to the proximity of the disks 20 and 25.

Having thus described my invention, what I claim is:

1. A speed indicator comprising a frame, two spindles mounted in said frame in alinement, means for driving one of said spindles from a power shaft, an indicating mechanism connected to be operated by the other spindle, said other spindle having a disk clutch members carried by said spindles one of said clutch members being movable toward and from the other, and a finger piece connected with the movable member of the clutch, said finger piece and disk being in proximity to each other to be simultaneously actuated by the fingers of one hand.

2. A speed indicator comprising a frame, two spindles mounted in said frame in alinement, means for driving one of said spindles from a power shaft, an indicating mechanism connected to be operated by the other spindle, clutch members carried by said spindles one of said clutch members being movable toward and from the other, a finger piece connected with the movable member of the clutch, and a disk connected to the other spindle whereby it and the indicator may be adjusted when the clutch members are separated, said finger piece and disk being in proximity to each other to be simultaneously actuated by the fingers of one hand.

3. A speed indicator comprising a frame having two bearing portions in alinement, said portions being connected by a web, means for supporting said frame adjacent a shaft, spindles mounted in said bearing portions of the frame, gearing connecting one of said spindles with the shaft, a clutch member slidably mounted upon and rotatable with one of said spindles, a coöperating clutch member carried by the other spindle and having a finger disk for adjusting it, and an indicator having hands similar to those of a clock or watch and connected to be actuated by the last mentioned spindle, said slidable clutch member having a disk in proximity to said adjusting finger disk.

In testimony whereof I affix my signature in presence of two witnesses.

JOHN H. CAPWELL.

Witnesses:
   FREDERIC A. GREENE,
   HOWARD E. BARLOW.